F. C. HAHN.
AUXILIARY DEVICE FOR TALKING MACHINES.
APPLICATION FILED MAY 6, 1918.
1,394,825.
Patented Oct. 25, 1921.
3 SHEETS—SHEET 1.
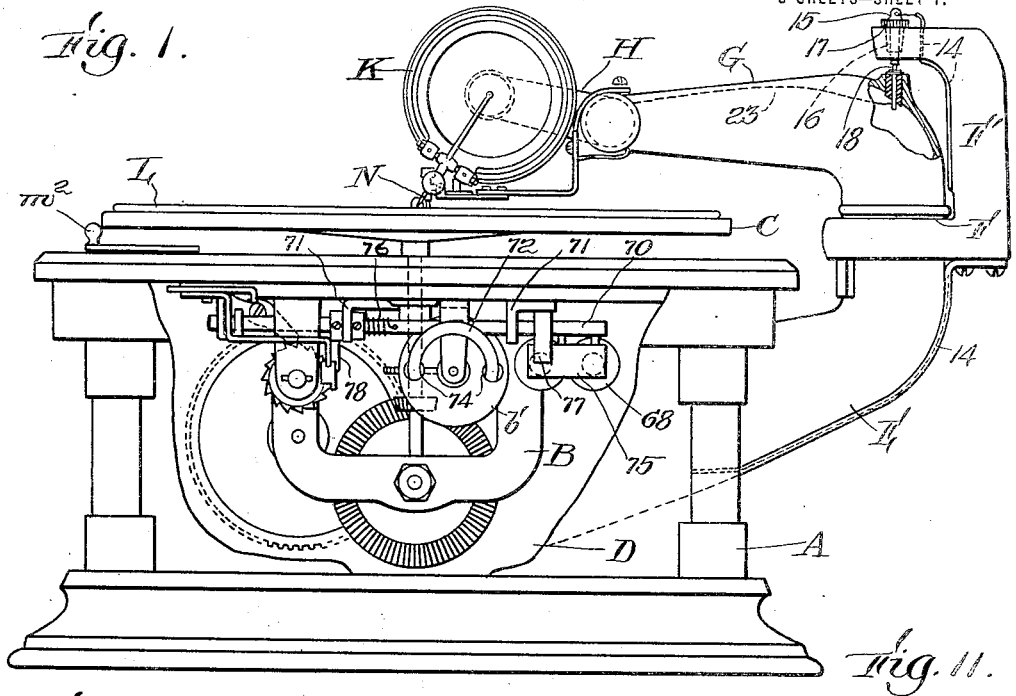
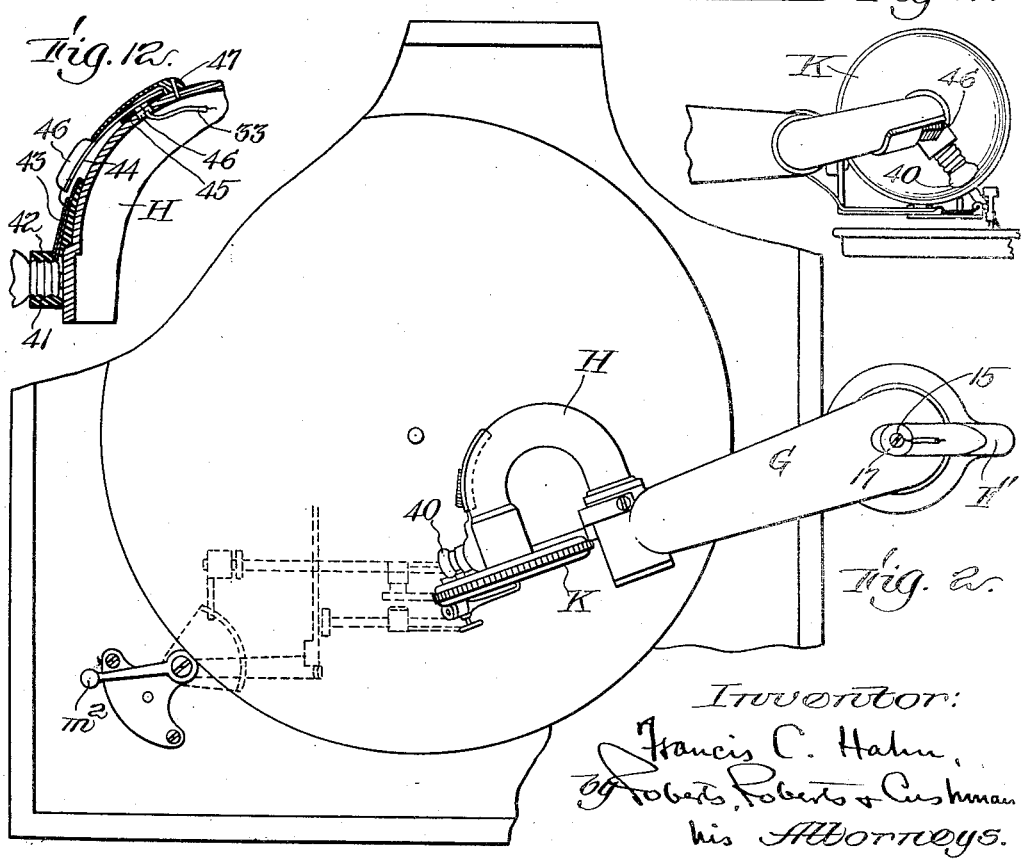
Inventor:
Francis C. Hahn,
By Roberts, Roberts & Cushman
his Attorneys.

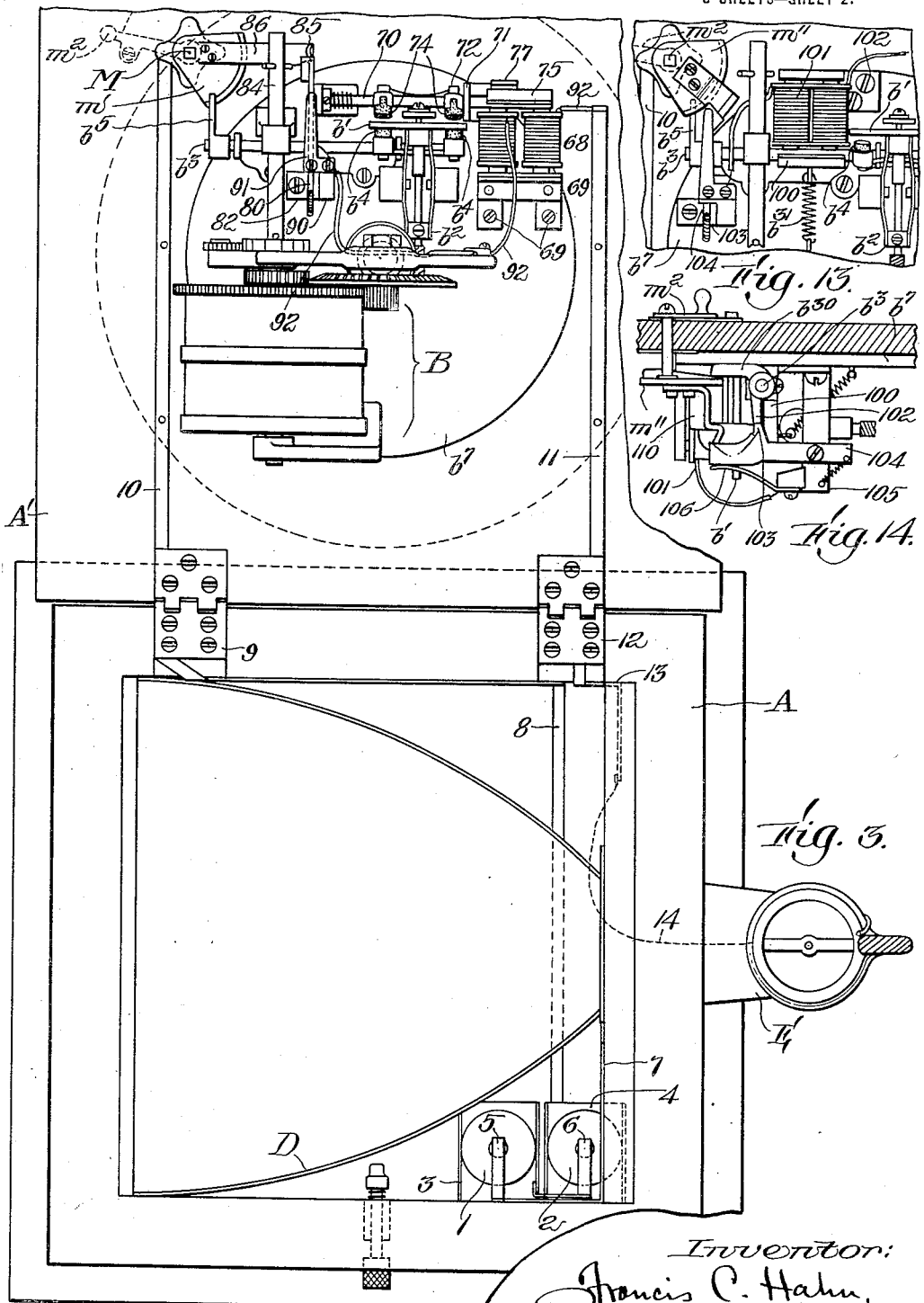

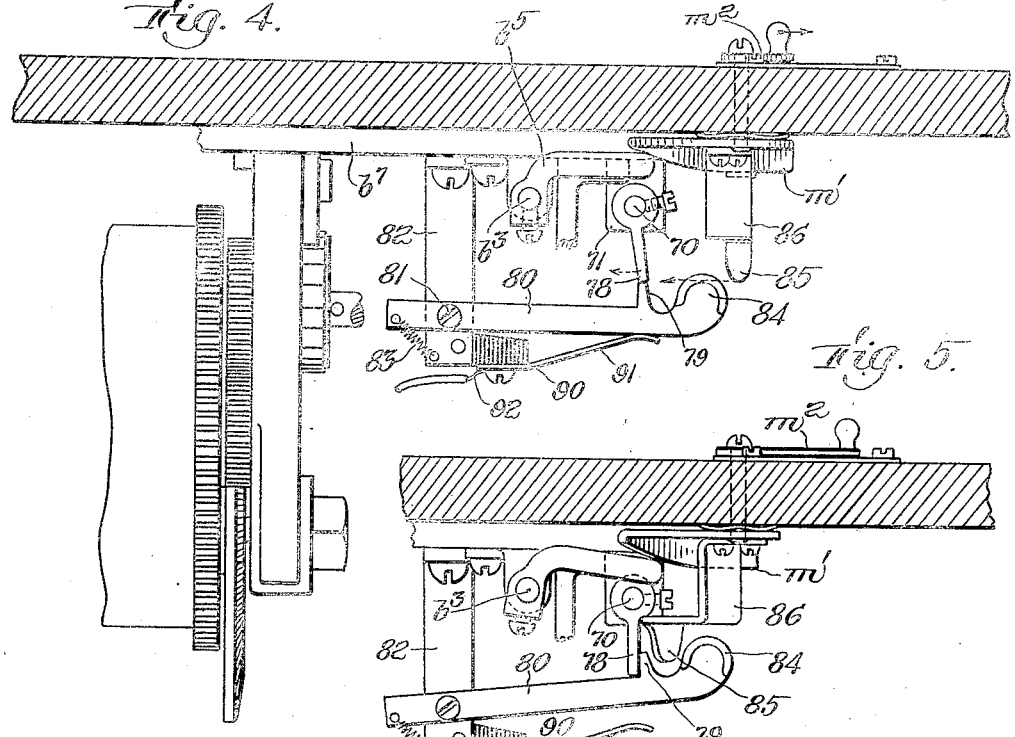

UNITED STATES PATENT OFFICE.

FRANCIS C. HAHN, OF NEWTON, MASSACHUSETTS.

AUXILIARY DEVICE FOR TALKING-MACHINES.

1,394,825.    Specification of Letters Patent.    Patented Oct. 25, 1921.

Application filed May 6, 1918. Serial No. 232,862.

*To all whom it may concern:*

Be it known that I, FRANCIS C. HAHN, a citizen of the United States of America, and resident of Newton, in the county of Middlesex and State of Massachusetts, have invented new and useful Improvements in Auxiliary Devices for Talking-Machines, of which the following is a specification.

This invention relates to auxiliary devices for talking machines, one object being to provide means for starting reproduction of a record at its beginning without loss of time or damage to record or reproducing means, and another object being to provide means for automatically stopping relative motion between the record and reproducing means when the record has been reproduced completely.

Other objects of the invention are to provide a detector element for automatically detecting the end of a phonographic record; to provide a power brake or other stop-motion adapted to be operated by indications of the detector; and to provide a connection between said detector and stopping devices adapted to be made operative to stop relative motion of record and reproducer upon the indication of the detector. Other objects are to provide in a talking machine electrical connections to the end of the tone arm adapted both to supply an incandescent lamp for occasional use, as for illuminating the record at the point of contact with the needle in order to adjust for correct contact; and to provide efficient, durable and sightly electrical connections between the reproducer part of such a machine and the frame or base of the machine for other purposes, such as for operating a power-release or power-brake mechanism.

Other objects are to provide for disconnecting from the electrical devices of an electrical stop-motion, illuminating device or other electrically controlled devices for talking machines the battery or other source of energy employed to operate the stop-motion or other device, or supply the illuminating device, except when the motor of the talking machine is running, and thereby to insure against accidental short circuit or waste of current.

Another object of the invention is to provide stop-motion means adapted to stop a talking machine when the useful part of a record-tablet, disk or cylinder (hereinafter referred to as a record) has passed the reproducing means, characterized by devices adapted to coöperate with indications either found on or easily applied to existing records for such talking machines, in order to enable an attachment for stopping the machine when the record has been reproduced to be used with existing records without change, and without requiring skill in adjustment or operation.

Referring now to the accompanying drawings which illustrate species only of the genus comprising my invention,—

Figure 1 is a side elevation of a talking machine, parts being broken away to show the motor;

Fig. 2 is a plan view of the device shown in Fig. 1.

Fig. 3 is a plan illustrating the base of the machine opened to show the motor in under plan and the horn and tone arm bearing circuit connections and battery in plan;

Fig. 4 is an enlarged elevation of parts of the motor and brake viewed from the right of Fig. 3;

Fig. 5 is a view similar to Fig. 4 showing the parts in a different position;

Figs. 6 and 7 are plan views showing the set and stopping positions respectively of the detector element of the stop-motion;

Figs. 8 and 9 respectively are corresponding side elevations;

Fig. 10 is a detail elevation of the motor governor showing a brake illustrating one form of my invention;

Fig. 11 is an elevation showing the illuminating device;

Fig. 12 is a section through the lighting switch;

Fig. 13 is a detail view similar to Fig. 3 showing a modification; and

Fig. 14 is a view in elevation from the left side of Fig. 13.

The talking machine may be of any usual or desired construction, the type chosen to illustrate the invention being provided with a base A, a spring motor B, a turn-table C driven thereby, an interior horn D continuing the exterior hollow bracket E having a bearing at F for the tone-arm G carrying the usual goose-neck H and sound box K. Talking machines of the type shown employ a flat disk record L upon which the needle N is swept inward substantially upon a radius of the disk as it follows a spiral sound-record groove containing the indications being reproduced. Freedom of the tone-arm G on its bearing F is therefore essential, in order to avoid transmitting to the needle N stresses tending to lift the needle N out of its directing groove.

An incandescent light preferably is provided near the needle N for illuminating the record at starting so as to place the proper part of the record groove under the needle before the record proper begins, and so as to avoid putting the delicate needle down on the record except in the groove. A light for this purpose to be effective should be near the needle, and preferably is arranged to be carried either by the sound box of the goose-neck H, as shown by the latter, in which position a very small lamp adapted momentarily to be lighted will sufficiently light the needle and the record at starting.

The invention also provides a detector for an automatic stop-motion moving with the tone-arm and having a sensitive portion in contact with the record L nearly in the radial line of the needle N and near it in the direction of a radius of the disk. Preferably this detector transmits its indications electrically, and both the illuminating device and the stop-motion device are provided with a connection to a source of energy, preferably a battery inclosed in the base A.

Referring now to Fig. 3 as shown two cells of dry battery 1 and 2 are preferably arranged to stand in a vacant space in one corner of the base outside of the horn D, conveniently resting on conducting plates 3, 4, and being provided with contact springs 5, 6, fixed in the base and connecting the cells in series with a conducting strip 7 connected to the bracket E, and a conducting strip 8 connected to one of the hinges 9 of the cover A' of the base box A. On the under side of the cover A' a conductor strip 10 leads to the brake-operating, starting and stopping cam m' forming a part of the existing machine, or to the equivalent arrangement employed in other types of machines. The under face of the top A' also carries another contact strip 11 connecting to the other hinge 12 and connected at 13 to an insulated wire 14 carried out through a hole in the box (or bracket E, not shown), and upon the outside of the bracket E.

Parts at the motor B are in circuit between the conductors 10 and 11, as will presently be described.

The invention provides for separating the tone-arm and goose-neck from each other and the remainder of the machine, and for reassembling them, without the use of skill in making electrical connections. It is also preferred not to limit the motion of the tone-arm G even to the slight extent involved by the torsion of a conductor, and for these reasons wire 14 is preferably carried through a bore in the overhanging bracket F' to contact with a binding screw 15 in the end of a tubular bearing 16 mounted in an insulating bushing 17 in an enlarged bore in the overhanging bracket F' so as to take over an insulated pintle 18 on the center of motion of the tone-arm. Preferably a fiber sleeve 19 is housed in a bore in the usual boss in the tone-arm and bored to receive pintle 18. Within the tone-arm G a wire 23 is connected to the pintle 18. While the arrangement for circuit 14, 23, as shown is preferred it will be understood that other forms of conductor insulated from bracket E and tone-arm G may be used instead if desired.

For the same reasons as above indicated it is desirable to carry the circuit 13, 23, into the goose-neck H through a readily separated and assembled connection without relying upon the flexibility of a conductor.

Referring to Figs. 6 and 7, the wire 23 at the outer end of the tone-arm may be connected to a contact ring 25 mounted within an insulating bushing 26 in the lateral bearing 27 at the end of the tone-arm G.

The goose-neck H terminates in a plug 28 turned down at 29 to receive an insulating bushing 30 upon which a contact ring 31 taking within the ring 25 is mounted. The parts are held assembled by a thumb screw 32 in a hole in the plug 28, as usual. A wire 33 is connected through a hole in the bushing 30 and plug 28 to the ring 31 and may be laid along the inside of the goose-neck H to a switch controlling a small incandescent lamp 40. Preferably the socket 41 (Fig. 12) for the lamp 40 is mounted on the under forward side of the goose-neck near the sound box K, a convenient mounting as shown, comprising an insulating block of fiber 42 riveted or screwed to the goose-neck H carrying the socket 41 and a conductor strip 43, with which a contact spring 44 mounted on an insulating washer 45 can make contact when an insulating finger piece 46 mounted on spring 44 is gently pressed. The finger piece 46 and spring 44 may be connected to wire 33 in any convenient manner such as shown, through a hole 46 in the goose-neck and the fiber washer 45. As so placed the finger piece 46 is at a part of the goose-neck grasped by the operator in making the adjustment to start reproduction, and no separate effort is required to light the lamp 40.

It will be understood that one side of the circuit controlled by the switch 43, 44, comprises the metal of the goose-neck H, tone-arm G and bracket E. The same connections may be utilized as the actuating connection from a stop-motion detector to stop the motor.

Referring now to Figs. 6, 7, and 8, the transverse bearing barrel 27 at the end of the tone-arm may be provided with a vise bracket 50 and set-screw 51 or other mounting for holding on it in adjusted relation a detector arm 52 adjustably fastened on a lug 53ª of the bracket 50 by screw 54ª. Arm 52 when adjusted extends horizontally above and free from contact with the record L and carries at its end a detector preferably made as an overweighted lever 53 having a plug 54 of a frictional non-abrasive soft substance, such as soft rubber, at one end, and a weight 55 at the other end. The lever 53 is mounted for very free motion about a horizontal pivot 56 in holes in lugs 57 on the arm 52, the pivot being offset as shown from the line joining the plug 54 and the center of gravity of the weight 55. When the lever 53 is in the position shown in Fig. 8, the plug 54 is gently forced against the surface of record L on turntable C.

Within the arc of motion of the weight 55 about the pivot 56 a contact plate 58, preferably having a friction spring 59 in a diagonal position thereon to contact with a cutaway surface 60 on the weight 55, is provided. Plate 58 is suitably insulated from the body of the arm 52, and connected by wire 61 to contact ring 25 or other connection, to the conductors 23, 11, 12, 13. The frictional plug 54, which may in some cases be a roll of textile fabric, or a bristle or hair brush or be made of felt, is in any case effective to sweep the record clean of dust, sand and the chips or powder abraded from it by previous use.

So long as no other type of surface than the normal sound-record surface of the record L being reproduced runs in contact with the plug 54, the weight 55 is sufficient to keep the lever 53 in the upright position shown in Fig. 8, but whenever an abnormal surface, such as a projection, roughness, or indentation or other departure 62 from a surface scored by a sound record, (but otherwise that of the usual phonographic record) runs in contact with the plug, the weight 55 is then thrown so far to the right as to overcome its tendency to stand in the position shown in Fig. 8, and then falls into and remains in the position shown in Fig. 9, the spring 59 preventing rebound. Contact is therefore closed between the metal parts of the machine G, 52, E, 7, and the conductors 61, 25, 23, 13, 12, 11, whenever an abnormal part of the record bearing a fixed relation to the end of the sound record thereon runs under the detector 54, 55, at the normal speed for reproduction of the record.

Records of all types are usually provided with numbers or marks as indicated at 62, Figs. 8 and 9, molded or stamped into their surfaces, and either bodily projecting or having burs raised by the stamping tool projecting from the surface of the record to an extent found in practice to be effective to work such a detector as herein disclosed. Such numbers or marks are by custom placed on the records near the end of the sound record, and for any one type of record are usually the same distance from the end of the record. If, therefore, the detector 54, 55 is placed at this distance from the needle, the machine will be stopped within a few revolutions at the most after the record has been completely traversed by the needle. In case the record has no projecting or burred number, a shallow depression cut into it with a drill or pocket-knife may be provided by the user, or a small piece of gummed paper be fastened to the record, or a friction surface may otherwise be formed thereon or applied thereto, to actuate the detector. The bracket 50 can be moved on the part 27 to adjust the radial position of the detector in reference to the needle, or the sound-box K may be moved at its usual sliding connection in the goose-neck H to adjust the position of the detector in reference to the radial distance on the record between the detector actuating number, mark, depression or surface and the end of the sound-record groove.

It will be obvious that any type of power-release or brake device adapted to stop the motor upon closing the circuit 10, 11 may be used with the detector above described. For motors of the type shown, a preferred device comprises a brake adapted to act on the brake disk $b'$ of the existing centrifugal governor $b^2$ whenever the circuit through conductors 10, 11 is closed. Such motors are usually provided with a rock-shaft $b^3$ spring actuated to press the brake blocks $b^4$ against the inner face of disk $b'$ whenever a cam $m'$ operated by the control lever $m^2$ is worked to release an arm $b^5$ on shaft $b^3$, the cam $m'$ also serving to position the brake-blocks to slow the motor whenever the centrifugal governor device forces the disk $b'$ against the blocks $b^4$, as will happen at speeds predetermined by the position of lever $m^2$ and consequent positions of blocks $b^4$. This invention additionally provides means whereby operation of the control lever $m^2$ closes a circuit between conductors 10 and 11 automatically opened after an actuation by the detector, so that the circuit can not be completed at the detector device unless the control lever has first been positioned to start the motor, the circuit thereafter being again opened automatically after the automatic devices have been actuated to stop the machine. Preferably the automatic brake comprises a rock-shaft 70 in bearings 71 on base $b^7$ having fast thereon a fork 72 carrying brake blocks 74 and an armature 75 for an electro-magnet 68 suitably mounted at 69 on the motor-base $b^7$, shaft 70 normally being turned to hold the blocks 74 away from disk $b'$ by a light spring 76, the armature 75 then resting against a stop 77 on base $b^7$.

Shaft 70 also has fast thereon a finger 78 adapted to coact with a lug 79 on a locking and circuit-controlling lever 80 to lock the shaft 70 in position to force the blocks 74 against disk $b$. Lever 80, as best shown in Figs. 4 and 5, may be pivoted at 81 on a standard 82 in electrical contact with the base $b^7$. A light spring 83 fast at one end to standard 82 normally holds lever 80 in the position shown in Fig. 5, from which it can be lifted by contact of an integral cam 84 formed on the lever 80 with a cam-end 85 of an arm 86 fastened on the cam $m'$ and swept past cam 84 whenever the control lever $m^2$ is moved to start the motor.

A contact spring 91 is mounted to make and break contact with lever 80 in the positions of Fig. 4 and Fig. 5 respectively, preferably being mounted on an insulating block 90 fast to standard 82. A conductor 92 connects spring 91 through electro-magnet 68 to conductor 11.

When the control lever $m^2$ is moved to work the arm $b^5$ and shaft $b^3$ to release the blocks $b^4$ from their normal contact with disk $b'$, motion of arm 86 and cam 85 with the cam $m'$ will then cause lever 80 to take the position shown in Fig. 4, finger 78 under influence of spring 76 then turning to release the blocks 74 from disk $b'$, as limited by stop 77, in which position the end of finger 78 abuts against the end of lug 79, and lever 80 is held in contact with spring 91. The circuit 10, $m'$, $b^5$, $b^7$, 82, 80, 91, 92, magnet 68, 11, is then complete, and if the detector contact 55, 57 should now be closed, the magnet 68 will attract the armature 75, forcing the blocks 74 against the disk $b'$, which also moves against the blocks $b^4$, thus stopping the motor and turn-table C. When the shaft 70 rocks under actuation of the armature, finger 78 is withdrawn from lug 79, lever 80 is actuated by spring 83, and finger 78 locks behind lug 79, thereby to hold shaft 70 and brake blocks 74 in position to stop the motor without aid from the magnet. The motion of lever 80 will have meanwhile separated the contact 80, 91, thus opening the circuit through magnet 68. The circuit will not be restored until the lever $m^2$ is again worked to start the motor.

In some cases the automatic control of the stop devices may act directly on the manually controlled parts. For instance, as shown in Figs. 13 and 14 the shaft $b^3$ of an existing brake $b^4$ adapted to be closed against the brake disk $b'$ of the governor $b^2$ by the control lever $m^2$, may be arranged also to be controlled in the same manner as the shaft 70 above mentioned. For this purpose the manually controlled cam $m^{11}$ is arranged as shown in an opposite sense from the prior arrangement so as to move an arm $b^{30}$ fast on shaft $b^3$ to close the brake $b^4$ against the disk $b'$ positively, the brake $b^4$ normally being maintained away from the disk $b'$ by spring $b^{31}$ replacing the oppositely acting spring of the prior construction. The shaft 70 $b^3$ by this means is adapted to be rocked in a direction to move the arm $b^{30}$ away from the cam $m^{11}$ by the automatic devices so as independently to stop the machine manually and automatically. For this purpose an armature 100 similar to the armature 70 is fixed to the shaft $b^3$ in position to be attracted by the electro-magnet 101 attached at 102 to the base $b^7$ of the motor.

Shaft $b^3$ has fixed thereto in constant relation to the armature 100 a finger 102 adapted to lock behind a lug 103 on a lever 104 for the same purposes as the lever 80, pivoted on a standard 105, and when in the position shown in Fig. 14, the lug 103 then resting on the end of finger 102, being adapted to make contact with a circuit closer 106 like the similar part 91 above described, and similarly connected to magnet 101, and conductors 10 and 11.

The manual control lever $m^2$ is arranged to be worked to unlock the lug 102, which is positioned behind the lug 103 to hold the brake $b^4$ against the disk $b'$ whenever it has been automatically actuated by the magnet 101 and armature 100. Preferably the cam $m^{11}$ carries for this purpose a supplementary cam arm 110 adapted to move the end of the lever 104 to release lug 103 whenever the motor is started by moving the control handle $m^2$.

The operation is the same as the form illustrated in Fig. 3.

When the motor is running, the lamp 50 may be lighted by closing the contact 43, 44, without stopping the motor, since the resistance of the lamp filament is relatively so considerable that the magnet 68 is not then strongly enough energized to work the shaft 70 (or the shaft 63) and its connections, as it will be when the detector momentarily closes through it and battery 1, 2, a circuit of relatively low resistance.

I claim:

1. A stop-motion for motor-driven talking machines having therein a detector mounted in predetermined relation to the reproducing needle and comprising a part adapted to bear frictionally on the sound record, said detector being displaceable in respect to the record and its mounting by the energy of relative motion of the record and detector whenever the detector is encountered by a part of the record of different character from the sound record proper, in combination with means for stopping the motion as a consequence of the displacement of the detector.

2. A stop-motion for motor-driven talking machines having therein a detector mounted in predetermined relation to the reproducing needle and comprising an overweighted pivoted part adapted to bear frictionally with a constant force on the sound record, said detector being displaceable in respect to the record and about its pivot by the energy of relative motion of the record and detector whenever the detector is encountered by a part of the record of different character from the sound record proper, in combination with means for stopping the motion as a consequence of the displacement of the detector.

3. A stop-motion for motor-driven talking machines having therein a detector mounted in predetermined relation to the reproducing needle and comprising a part adapted to bear frictionally on the sound record, said detector being displaceable in respect to the record and its mounting by the energy of relative motion of the record and detector whenever the detector is encountered by a part of the record of different character from the sound record proper, in combination with a normally open conductor circuit including an electro-magnetically operated brake adapted to be closed by the displaced detector.

4. A stop-motion for talking machines having therein a weighted detector lever pivoted eccentrically to its center of gravity, a friction device on the detector adapted to bear on the sound record, and means for supporting the detector in contact with the moving record, whereby abnormally frictional parts of the record may overset the detector against gravity into a displaced position in which the detector is retained by gravity, and means operated by the displaced detector for stopping the machine.

5. A stop-motion detector for talking machines comprising a friction device adapted to feel the surface of the record, means adapting the detector to be thrown out of contact with the record by encounter of the friction-device with a surface abnormal to the sound-record surface, and means actuated on displacement of the detector for stopping the machine.

6. A stop-motion detector for talking-machines comprising a part adapted normally to bear on the surface of the sound-record with a predetermined light pressure, and means whereby an impulse transmitted to said part by an abnormal surface of the record may cause said part to take and retain another position out of contact with the record.

7. A stop-motion for motor-driven talking-machines comprising a part adapted normally to bear on the surface of the sound-record with a predetermined light pressure, and means whereby an impulse transmitted to said part by an abnormal surface of the record may cause said part to take and retain another position out of contact with the record, means to stop the motor, and a connection for actuating said stopping means made operative when said part is in said other position.

8. A stop-motion detector for talking-machines comprising a pivoted part normally positioned by gravity with one end in contact with the sound record, a pivot for said part out of alinement between its center of gravity and said end, whereby an abnormal surface of the record may displace said part, in combination with a connection for operating stopping devices adapted to be completed by said part when it is displaced.

9. A talking-machine having therein a movable tone-arm, goose-neck, sound-box, and a record-reproducing needle carried thereby, in combination with a stop-motion detector adapted to feel the surface of the record and to be displaced by a part thereof within the sound record, a mounting therefor rigid on and movable with the tone-arm, and means for stopping the machine controlled by said detector.

10. A talking-machine having therein a movable tone-arm, goose-neck, sound-box, and a record-reproducing needle carried thereby, in combination with a stop-motion detector movable about a pivot substantially tangential to the circular arc swept by the tone arm adapted to feel the surface of the record ahead of the needle, a mounting for the detector adjustably fixed on the tone-arm, and means for stopping the machine controlled by said detector when displaced about said pivot.

11. A stop-motion detector for talking-machines comprising a displaceably-mounted part adapted to rest on the record with a light pressure and having a friction plug of soft rubber for contact with the record-surface, whereby to be displaced by an abnormality of said surface running under the detector at the usual speed of reproduction.

12. A talking-machine having therein a motor and means adapted to be operated automatically to stop the machine comprising a connection and means operated thereby to stop the motor and to break said connection, means for locking the motor-stopping means in stopping position, and starting means for releasing said locking means and restoring said connection.

13. A talking-machine having therein a motor, automatic means for stopping the motor comprising a brake for the motor, operating means for said brake, a connection to said operating means, and means for automatically operating said connection, in combination with means for locking the brake in operation after its automatic operation independently of said connection.

14. A talking-machine having therein a motor, manually controlled means for starting the motor, automatic means for stopping the motor comprising a brake for the motor, operating means for said brake, a connection to said operating means, means for automatically operating said connection, in combination with means for locking the brake in operation after its automatic operation independently of said connection, and means for releasing said brake controlled by said manually controlled means.

15. A talking-machine having therein a motor and means adapted to be operated automatically to stop the machine comprising an electrical connection, an electromagnet, and means operated thereby to stop the motor and to break said connection, means independent of said magnet for locking the motor-stopping means in stopping position, and starting means for releasing said locking means and restoring said electrical connection.

16. A talking-machine having therein sound-reproducing means having relatively movable and detachable parts, in combination with one or more auxiliary electrical attachments for said reproducing means comprising circuit connections in the several movable and detachable parts, said connections being movable with and adapted to be severed and joined together when the several parts are detached and attached respectively.

17. A talking-machine having therein sound-reproducing means having parts relatively movable on and detachable from each other, in combination with an auxiliary electrical attachment having one or more circuit-closing devices mounted on parts of said sound-reproducing means; a source of energy, and circuit connections therefrom to said attachment, said connections comprising parts on and insulated from the respective parts of the sound-reproducing means and adapted to be electrically connected together when the respective parts are assembled in operative relation.

18. A talking-machine having therein means for supporting and means for causing relative motion between a sound-record and a reproducing instrument, in combination with means for illuminating the region of contact between the sound-record and reproducing instrument, and means for automatically stopping the said relative motion, said illuminating and stopping means including a common source of energy and common circuit connections thereto carried by the means for supporting the reproducing instrument.

19. A talking-machine having therein a motor and a support for sound-reproducing means, and a stop-motion device comprising a circuit-closing detector carried by said support, an incandescent lamp carried by said support, a common connection for said lamp and detector carried by said support, means for closing circuit through the lamp, a source of energy in said circuit, and means in said circuit adapted to cause stoppage of the motor when the detector is actuated to close said circuit.

20. An electric stop-motion for talking machines having therein a conductor circuit containing an electro-magnet of an electromagnetically operated stopping device, locking means for holding said device in stopping position, circuit controlling means for said stopping device adapted to open said circuit upon actuation of said locking means, and means for releasing said locking means and closing said circuit for a new operation.

Signed by me at Boston, Massachusetts, this third day of May, 1918.

FRANCIS C. HAHN.